(12) United States Patent  (10) Patent No.: US 7,643,056 B2
Silsby  (45) Date of Patent: Jan. 5, 2010

(54) MOTION DETECTING CAMERA SYSTEM

(75) Inventor: Christopher Dean Silsby, Albany, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 850 days.

(21) Appl. No.: 11/079,401

(22) Filed: Mar. 14, 2005

(65) Prior Publication Data

US 2006/0203101 A1  Sep. 14, 2006

(51) Int. Cl.
  *H04N 7/18*  (2006.01)
  *H04N 5/225*  (2006.01)
(52) U.S. Cl. ........................ 348/155; 348/143; 348/152; 348/372
(58) Field of Classification Search ................. 348/143, 348/152, 155, 372
  See application file for complete search history.

(56) References Cited

U.S. PATENT DOCUMENTS

| | | | |
|---|---|---|---|
| 5,365,597 A | 11/1994 | Holeva | |
| 5,434,617 A | 7/1995 | Bianchi | |
| 5,602,585 A * | 2/1997 | Dickinson et al. | 348/155 |
| 5,631,704 A * | 5/1997 | Dickinson et al. | 348/308 |
| 5,748,231 A * | 5/1998 | Park et al. | 348/207.99 |
| 5,898,459 A | 4/1999 | Smith et al. | |
| 6,028,626 A | 2/2000 | Aviv | |
| 6,079,862 A | 6/2000 | Kawashima et al. | |
| 6,166,729 A * | 12/2000 | Acosta et al. | 715/719 |
| 6,295,064 B1 | 9/2001 | Yamaguchi | |
| 6,326,994 B1 | 12/2001 | Yoshimatsu | |
| 6,385,772 B1 * | 5/2002 | Courtney | 725/105 |
| 6,392,632 B1 | 5/2002 | Lee | |
| 6,392,694 B1 | 5/2002 | Bianchi | |
| 6,433,683 B1 * | 8/2002 | Robinson | 340/540 |
| 6,480,225 B1 * | 11/2002 | Kim | 348/143 |
| 6,577,234 B1 * | 6/2003 | Dohrmann | 340/540 |
| 6,624,849 B1 * | 9/2003 | Nomura | 348/241 |
| 6,677,979 B1 | 1/2004 | Westfield | |
| 6,677,990 B1 | 1/2004 | Kawahara | |
| 6,753,904 B1 * | 6/2004 | Nomura | 348/208.1 |
| 6,970,183 B1 * | 11/2005 | Monroe | 348/143 |
| 7,023,469 B1 * | 4/2006 | Olson | 348/152 |
| 7,075,567 B2 * | 7/2006 | Hunter et al. | 348/208.13 |
| 7,161,479 B2 * | 1/2007 | Sobol | 340/506 |
| 2003/0025800 A1 | 2/2003 | Hunter et al. | |

(Continued)

OTHER PUBLICATIONS

Simoni et al., "A Single-Chip Optical Sensor with Analog Memory for Motion Detection", IEEE Journal of Solid-State Circuits, vol. 30, No. 7, pp. 800-806, Jul. 1995.*

(Continued)

*Primary Examiner*—Sinh Tran
*Assistant Examiner*—Richard M Bemben
(74) *Attorney, Agent, or Firm*—RatnerPrestia

(57) ABSTRACT

A motion detecting camera system includes a portable motion detection device having an image sensor for detecting motion within a field of view of the motion detection device and automatically generating a digital image of a scene within the field of view upon detection of motion. The motion detection device includes a cellular telephone transmitter for transmitting cellular telephone communications. The camera system includes a base unit having a display screen. The motion detection device is configured to automatically transmit the digital image via the transmitter to the base unit for display on the display screen.

20 Claims, 3 Drawing Sheets

U.S. PATENT DOCUMENTS

| | | | |
|---|---|---|---|
| 2003/0095186 | A1 | 5/2003 | Aman et al. |
| 2003/0107648 | A1* | 6/2003 | Stewart et al. ............... 348/143 |
| 2004/0001149 | A1 | 1/2004 | Smith |
| 2004/0212677 | A1 | 10/2004 | Uebbing et al. |
| 2004/0212678 | A1* | 10/2004 | Cooper et al. ................ 348/155 |
| 2005/0057649 | A1* | 3/2005 | Marks ......................... 348/143 |
| 2005/0132414 | A1* | 6/2005 | Bentley et al. ............... 725/105 |
| 2005/0285941 | A1* | 12/2005 | Haigh et al. ................. 348/155 |
| 2006/0066720 | A1* | 3/2006 | Renkis ........................ 348/143 |
| 2006/0070110 | A1* | 3/2006 | Mercer ........................ 725/105 |
| 2006/0150227 | A1* | 7/2006 | Julia et al. ................... 725/105 |
| 2006/0156361 | A1* | 7/2006 | Wang et al. .................. 725/105 |
| 2006/0176369 | A1* | 8/2006 | Meritt ......................... 348/143 |
| 2008/0024605 | A1* | 1/2008 | Osann ......................... 348/143 |
| 2008/0068458 | A1* | 3/2008 | Carroll ........................ 348/143 |

OTHER PUBLICATIONS

Agilent product information & literature webpage entitled "ADNS-2030 High-Performance, Low Power Optical Mouse Sensor (Optimized for Cordless Mouse Applications)"; 2000; 2 pgs.

Agilent product information packet entitled "Optimized Mice and How They Work"; Nov. 5, 2001; 4 pgs.

Agilent product overview entitled "Agilent ADNS-2030 Optical Mouse Sensor"; Mar. 10, 2003; 4 pgs.

Agilent data sheet entitled "Agilent ADNS-2030 Low Power Optical Mouse Sensor"; Mar. 12, 2003; 36 pgs.

MCM Electronics homepage (www.mcmelectronics.com); Apr. 25, 2003; 1 pg.

MCM Electronics product catalog; pp. 564-565. (C) 2003.

* cited by examiner

MOTION DETECTING CAMERA SYSTEM

BACKGROUND

Many security camera systems employed today have wired links to VCRs, closed circuit television monitors, or computers. These systems are usually complex to set up, and are typically set up either by users experienced with some level of electronics, or professional security agencies. These systems can also be very costly.

Existing security camera systems typically consume relatively large amounts of power, and are usually not battery-powered, or if they are battery-powered, the battery life is relatively short due to the large power consumption. Some security camera systems are also configured to record at all times, rather than only when there is activity, which consumes additional power, and wastes video tape or digital recording space.

Some security camera systems use passive infrared (PIR) motion detectors to detect motion and trigger a security camera. PIR motion detectors detect radiated energy, such as energy radiated by a human or animal. PIR motion detection devices are typically costly, and have a relatively short battery life.

SUMMARY

One form of the present invention provides a motion detecting camera system. The camera system includes a portable motion detection device having an image sensor for detecting motion within a field of view of the motion detection device and automatically generating a digital image of a scene within the field of view upon detection of motion. The motion detection device includes a cellular telephone transmitter for transmitting cellular telephone communications. The camera system includes a base unit having a display screen. The motion detection device is configured to automatically transmit the digital image via the transmitter to the base unit for display on the display screen.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
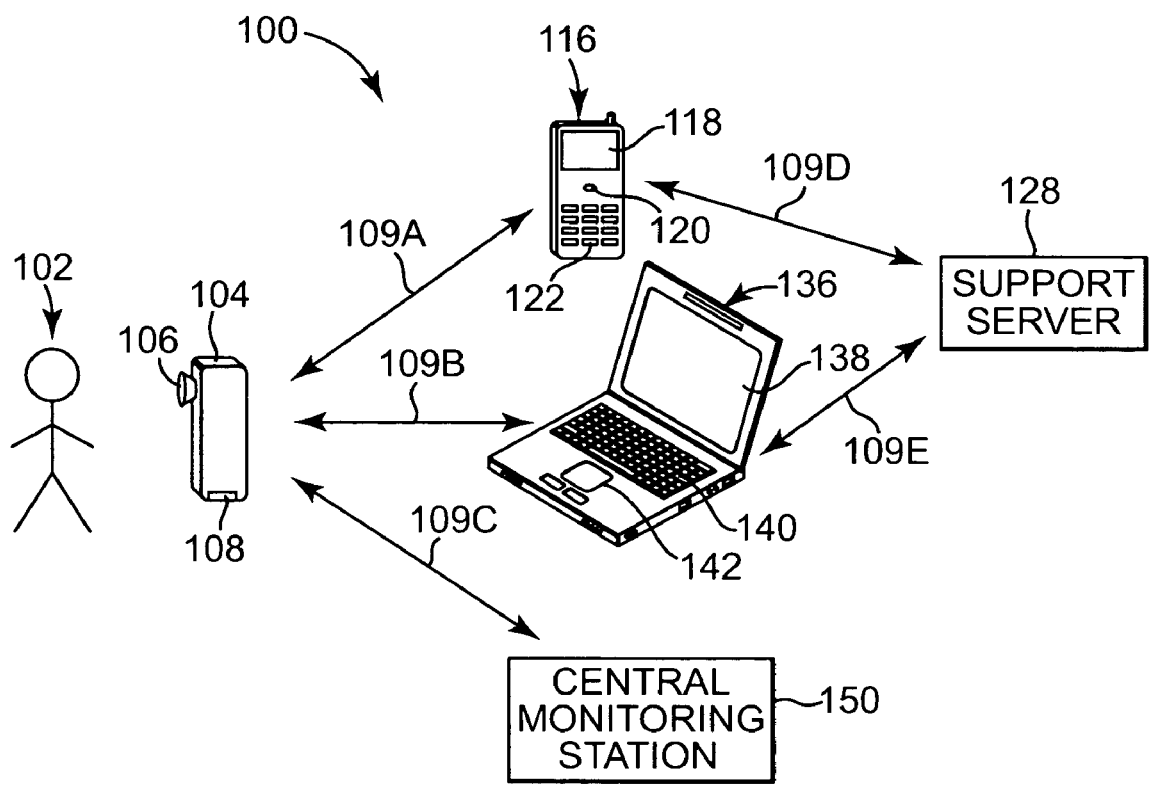
FIG. 1 is a diagram illustrating a motion detecting camera system according to one embodiment of the present invention.

FIG. 1 is a diagram illustrating a motion detecting camera system 100 according to one embodiment of the present invention. System 100 includes portable motion detection device 104, base units 116 and 136, support server 128, and central monitoring station 150. In one embodiment, motion detection device 104 and base unit 116 are cellular telephone devices that have the same size as conventional cellular telephones (e.g., less than about 4 inches in length, less than about 2 inches in width, and less than about 1 inch in depth), and base unit 136 is a laptop computer. In one form of the invention, motion detection device 104 is a very low power motion detection device with a camera and cellular telephone communications capability. Motion detection device 104 includes a lens 106 and an input/output interface 108. Base unit 116 includes display screen 118, and user input devices 120 and 122. In one embodiment, input device 120 is a conventional screen pointer controller for making menu selections from display 118 and controlling a screen pointer on display 118. In one form of the invention, input device 122 is a conventional keyboard or keypad for entering alphanumeric data. Base unit 136 includes display screen 138, keyboard 140, and touchpad 142.

Motion detection device 104 is configured to communicate with base unit 116, base unit 136, and central monitoring station 150 via communication links 109A, 109B, and 109C, respectively. In one embodiment, communication links 109A, 109B, and 109C are wireless communication links. In one form of the invention, communication links 109A, 109B, and 109C are cellular telephone communication links. Base unit 116 and base unit 136 are configured to communicate with support server 128 via communication links 109D and 109E, respectively. In one embodiment, communication link 109D is a wireless communication link (e.g., cellular telephone communication link), and communication link 109E is a wired or wireless communication link for communicating over the Internet.

Motion detection device 104 is placed at any desired location by a user to sample a scene 102 within the field of view of device 104. If the scene 102 changes significantly, indicating that motion has occurred, then in one embodiment, motion detection device 104 wirelessly transmits one or more digital images of the scene 102 to one or more of base unit 116, base unit 136, and central monitoring station 150. Images received by base units 116 and 136 are displayed on display screens 118 and 138, respectively. In this manner, motion detecting camera system 100 allows a user to remotely and wirelessly monitor any desired location, and view images of events that have triggered a motion detection indication.

The central monitoring station 150 includes equipment for receiving digital images from multiple motion detection devices 104, and maintains contact information for users of each of the motion detection devices 104. In one embodiment, when central monitoring station 150 receives a digital image from a motion detection device 104, the central monitoring station 150 contacts the user of the motion detection device 104 based on the stored contact information to notify the user that motion has been detected by the user's device 104. In one form of the invention, the process of receiving images and notifying users performed by central monitoring station 150 is a completely automated process. In another embodiment, any of the functions performed by central monitoring station 150 may be performed by individuals. For example, a person may examine received images to identify the content of the images, and then make a determination of whether to contact the user. In another embodiment, the examination of the images to determine if the user should be contacted is an automated process performed by digital imaging processing equipment. In one form of the invention, central monitoring station 150 also forwards received images to a user's base unit 116 or 136. The operation of system 100 is described in further detail below with reference to FIGS. 2 and 3.

Figure 2:
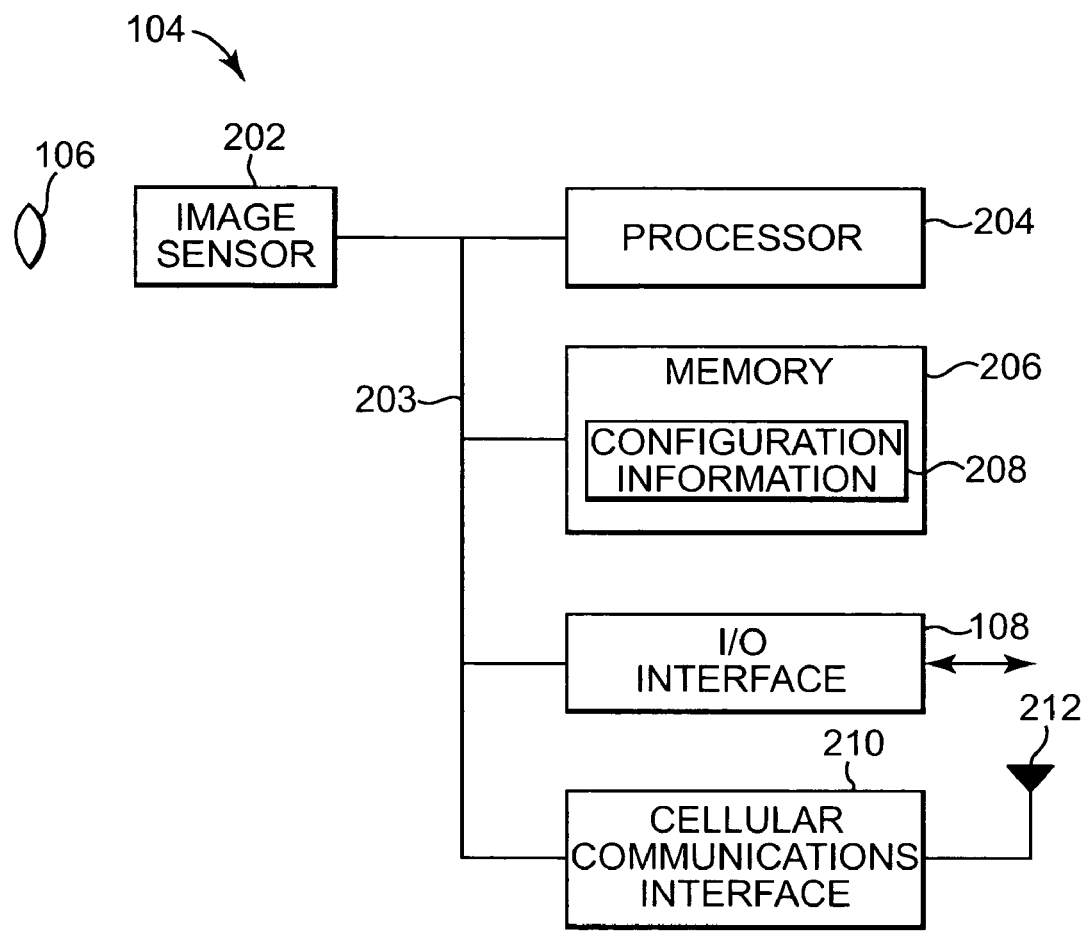
FIG. 2 is a block diagram illustrating major components of the motion detection device shown in FIG. 1 according to one embodiment of the present invention.

FIG. 2 is a block diagram illustrating major components of the motion detection device 104 shown in FIG. 1 according to one embodiment of the present invention. Motion detection device 104 includes lens 106, image sensor 202, processor 204, memory 206, input/output (I/O) interface 108, and cellular communications interface 210. Motion detection configuration information 208 is stored in memory 206. In one embodiment, memory 206 includes some type of random access memory (RAM) and non-volatile memory, but can include any known type of memory storage. Image sensor 202, processor 204, memory 206, input/output (I/O) interface 108, and cellular communications interface 210 are communicatively coupled together via communication link 203.

In operation, according to one embodiment, optical images within the field of view of motion detection device 104 are directed by lens 106 onto image sensor 202. In one form of the invention, image sensor 202 continually generates analog image data at a programmed frame rate, and analyzes the analog image data to determine if motion has occurred. In one embodiment, image sensor 202 is a low-power CMOS image sensor with CIF (352×288) resolution, and the number of frames captured per second by image sensor 202 is programmable by a user. In one form of the invention, the operation of image sensor 202 is optimized to minimize power consumption and maximize detection of whatever events the user would like the device 104 to recognize.

In one embodiment, image sensor 202 is pre-programmed as a default to capture five frames per second. In one form of the invention, image sensor 202 is operated primarily in a low power consumption sleep mode, and includes an internal timer (not shown) to wake the image sensor 202 five times per second. Each time that image sensor 202 wakes up, the sensor 202 captures another image. The analog image data is analyzed by image sensor 202 to determine whether motion has occurred, and then image sensor 202 goes back into sleep mode if no motion has occurred. Operating image sensor 202 at a low frame rate and in the sleep mode in this manner provides significant power savings. In another embodiment, image sensor 202 is configured to capture more or less than five frames per second.

In one embodiment, if the image sensor 202 determines that motion has occurred, image sensor 202 begins digitizing one or more captured images. In one form of the invention, image sensor 202 generates grayscale digital images at a CIF resolution with eight bits per pixel. In another embodiment, image sensor 202 generates color digital images. In one form of the invention, image sensor 202 analyzes the digital images and, based on the content of the digital images, determines whether to transmit one or more of the digital images to one or more of base unit 116, base unit 136, and central monitoring station 150 (FIG. 1).

In one embodiment, upon detection of motion, processor 204 wakes up the cellular communications interface 210, which is normally in a low-power sleep mode, and causes one or more digital images generated by image sensor 202 to be transmitted via the cellular communications interface 210 and antenna 212 to one or more of base unit 116, base unit 136, and central monitoring station 150.

Image sensor 202 may use a variety of different techniques for determining whether motion has occurred. The motion detection techniques are generally directed at identifying changes between two successive images, quantifying the amount of change, and comparing the amount of change to a threshold value to determine whether the change is significant enough to generate a motion detection indication. In one embodiment, the threshold values are user-programmable, and may be set on a pixel by pixel basis, or for entire frames. For example, if one or two pixels repeatedly result in the false generation of motion indications, the threshold values for those specific pixels can be set higher than the other pixels.

In one embodiment, motion detection is accomplished by image sensor 202 by comparing a newly captured sample frame with a previously captured reference frame. In another embodiment, processor 204 is configured to detect motion based on image data output by image sensor 202. In one form of the invention, image sensor 202 determines one or more average analog intensity values for each sample frame, and compares the average intensity values to values determined for a previously captured reference frame. If the difference between the average intensity values for the two frames is greater than a predetermined threshold, image sensor 202 outputs a motion indication or flag to processor 204. In another embodiment, motion detection is accomplished by image sensor 202 by comparing analog image data from a sample frame with analog image data from a previously captured reference frame on a pixel-by-pixel basis to determine whether there has been any change between the two frames. The value chosen for the threshold (or thresholds) depends upon the desired sensitivity of motion detection. By using a relatively large threshold value, motion flags will only be generated for large movements, such as movements of a human, and motion flags will not be generated for smaller movements, such as those of small animals.

In another embodiment, motion detection is accomplished by analyzing one or more of the statistics of an image from image sensor 202 (e.g., average digital number (DN), which represents the average signal output from all of the pixels in the pixel array; average column DN; max column DN; average row DN; max row DN; percent of the pixels in the array that are black, white, red, green, and/or blue; percent of the pixels in the array that fall within a certain red, green, blue ratio range and value range that is associated with lip color or various skin colors; etc.) and comparing the statistical results to a previous value or threshold to decide if motion of a certain amount or type has occurred, or whether a particular object is present in the image. The value chosen again depends on the desired sensitivity and the type of motion or objects that the user would like to detect.

I/O interface 108 of motion detection device 104 is configured to be coupled to base unit 116 or 136 (FIG. 1) via a cable to allow motion detection device 104 to be programmed by a user via the base unit 116 or 136. In one embodiment, I/O interface 108 is a serial interface. In one form of the invention, I/O interface 108 is a Universal Serial Bus (USB) interface. The programmed settings are stored as configuration information 208 in memory 206. In another embodiment, motion detection device 104 is configured to be wirelessly programmed by base unit 116 or 136 via communication links 109A or 109B.

In one embodiment, the user-programmable configuration information 208 includes motion detection sensitivity settings, which may be adjusted to accommodate the user's needs. In one embodiment, the sensitivity settings are automatically determined by device 104 based on a selection made by a user of an event from a list of common events to be detected (e.g., animals, people, any movement, anything larger than X, anything smaller than X, anything that makes noise and moves, car, plane, anything that changes the scene by X %, etc.).

In one form of the invention, the configuration information 208 also includes time and date information, and destination contact information. The time and date information identifies the dates and times that motion detection device 104 automatically enables itself to detect motion and transmit images. In one form of the invention, motion detection device 104 is configured to remain in a low-power sleep or standby mode and not transmit images other than the dates and times specified in the time and date information. The destination contact information includes a telephone number or other contact information (e.g., web location, email address, etc.) for one or both of base units 116 and 136, or optionally for the central monitoring station 150. In one embodiment, upon detection of motion, motion detection device 104 automatically transmits captured digital images to the destination or destinations specified in the destination contact information.

In one embodiment, support information for system 100, such as updated software, various detection algorithms, or other support information, may be downloaded by base unit 116 or 136 from support server 128 via communication link 109D or 109E. The base unit 116 or 136 can then transfer downloaded support information to motion detection device 104 via communication link 109A or 109B, or via the I/O interface 108 on device 104.

In one embodiment, motion detection device 104 and base unit 116 are sold together as a package, and the motion detection device 104 is pre-programmed with default sensitivity settings and the contact number of the base unit 116. Thus, a user just needs to add batteries to the motion detection device 104 (if batteries are not included), place the device 104 at a desired location, turn on the device 104, and the user is ready to remotely and wirelessly monitor the location. In another embodiment, server 128 is configured to wirelessly program motion detection device 104 with the number of base unit 116. In this manner, a service provider can automatically link a user's motion detection device 104 to the user's base unit 116, without requiring the user to navigate complex user menus, or go through complex set-up procedures.

In one embodiment, motion detection device 104 does not have a display or user input device (e.g., keyboard, keypad, screen pointer controller, etc.), which significantly reduces the cost of device 104. A user input device is not needed on device 104 according to one embodiment because the base units 116 and 136 can be used to program the device 104 as described above. A display is not needed in device 104 according to one embodiment because the images captured by device 104 can be displayed on the displays of the base units 116 and 136. In one embodiment, cellular communications interface 210 of device 104 includes a transmitter for transmitting cellular communications, but does not include a receiver for receiving cellular communications, which further reduces costs and power consumption of device 104. In one form of the invention, the motion detection device 104 is configured to automatically notify one or more of base unit 116, base unit 136, and central monitoring station 150, when the batteries of the motion detection device 104 are running low.

Figure 3:
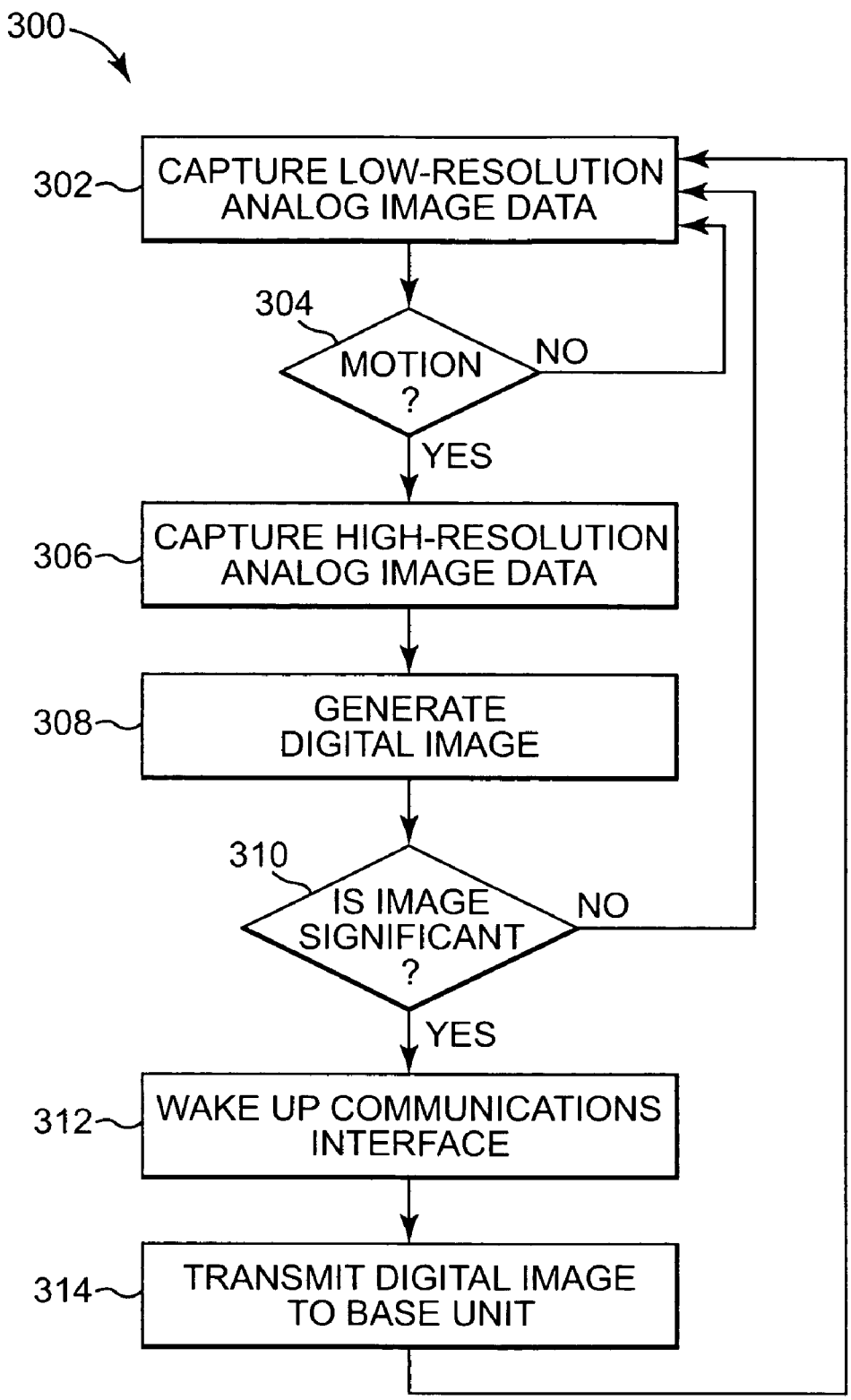
FIG. 3 is a flow diagram illustrating a method for detecting and reporting motion according to one embodiment of the present invention.

FIG. 3 is a flow diagram illustrating a method 300 for detecting and reporting motion according to one embodiment of the present invention. In one embodiment, motion detection device 104 is configured to perform method 300. At 302 in method 300, image sensor 202 of device 104 captures a low-resolution analog image of the scene 102 within its field of view. In one embodiment, the low-resolution analog image captured at 302 has a resolution that is less than the full CIF resolution of the image sensor 202. At 304, image sensor 202 analyzes the captured analog image data and determines whether motion has occurred. If it is determined at 304 that no motion has occurred, the method 300 returns to 302. If it is determined at 304 that motion has occurred, the method moves to 306.

At 306 in method 300, image sensor 202 captures a high-resolution (e.g., CIF resolution, 1.3 Mpixel resolution, or higher) analog image of the scene 102 within its field of view. At 308, image sensor 202 powers-up analog-to-digital conversion circuitry within sensor 202 (which is normally powered-down to conserve battery power in one embodiment), and digitizes the analog image captured at 306, thereby generating a high resolution digital image.

At 310 in method 300, image sensor 202 analyzes the content of the digital image generated at 308, and determines if the image is significant. In one form of the invention, image sensor 202 is configured to identify types of objects (e.g., human, animal, inanimate objects, etc.) appearing in the digital image generated at 308 based on features of the objects (e.g., size, skin, facial features such as eyes, ears, and lips, etc.), and make the determination at 310 based on the identified objects. For example, in one embodiment, image sensor 202 is configured to identify an image as being significant at 310 only if a human is shown in the image.

If it is determined at 310 that the digital image generated at 308 is not significant, the method 300 returns to 302. If it is determined at 310 that the digital image generated at 308 is significant, the method 300 moves to 312. At 312, processor 204 wakes up the cellular communications interface 210 (which is normally in a low-power sleep mode in one embodiment to conserve battery power). At 314, processor 204 causes the digital image generated at 308 to be transmitted by cellular communications interface 210 and antenna 212 to one or both of the base units 116 and 136 for display thereon, or to the central monitoring station 150. The method 300 then returns to 302.

In another embodiment of the present invention, rather than having digital images automatically transmitted from motion detection device 104 to base unit 116 or 136 when motion is detected (i.e., motion detection mode), system 100 can be operated in a remote viewing mode. In this mode, a user of base unit 116 or 136 selects a remote viewing menu option, and the base unit 116 or 136 automatically contacts the motion detection device 104. Motion detection device 104 then responds by transmitting digital images of the scene currently being viewed to the requesting base unit 116 or 136. In this manner, at any desired time or location, a user can remotely view a scene at the location of the motion detection device 104.

It will be understood by a person of ordinary skill in the art that functions performed by motion detecting camera system 100 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Cellular telephones are considered by users as easy to use, reliable devices that are easy to set up. One form of the present invention provides a low cost and very low power motion detecting camera system 100 based on cell phone technology. Unlike some existing wired security camera systems, in one embodiment of the present invention, there are no cables to run, and set-up and operation of the system 100 is easily accomplished by any user.

One form of the present invention provides a motion detection device 104 that consumes a relatively small amount of power. The motion detection device 104 according to one embodiment of the present invention is battery powered. The power savings provided by embodiments of the present invention provide for longer battery life, and/or the ability to use smaller batteries. In one embodiment, the motion detection device 104 includes a CMOS image sensor chip operated primarily in a low power sleep mode, which consumes about 15 milliwatts at 5 frames per second. One embodiment of the motion detection device 104 has a battery life of 150-300 hours (950 mAh). In one form of the invention, the motion detection device 104 is also configured to be plugged into a wall outlet.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A motion detecting camera system, comprising: a portable motion detection device having an image sensor for detecting motion within a field of view of the motion detection device and automatically generating a digital image of a scene within the field of view upon detection of motion, the motion detection device including a cellular telephone transmitter for transmitting cellular telephone communications; a base unit having a display screen; wherein the motion detection device is configured to automatically transmit the digital image via the transmitter to the base unit for display on the display screen, wherein the image sensor is configured to detect motion using analog image data captured by the image sensor that has not been converted into digital image data and wherein the image sensor is configured to power up an analog-to-digital converter and generate the digital image responsive to the detection of motion.

2. The motion detecting camera system of claim 1, wherein the base unit is a cellular telephone.

3. The motion detecting camera system of claim 1, wherein the base unit is a computer.

4. The motion detecting camera system of claim 1, wherein the motion detection device is configured to automatically transmit the digital image via the transmitter to a central monitoring station that monitors a plurality of motion detection devices.

5. The motion detecting camera system of claim 1, wherein the motion detection device does not include a user input device or a display screen.

6. The motion detecting camera system of claim 1, wherein the motion detection device does not include a cellular telephone receiver for receiving cellular telephone communications.

7. The motion detecting camera system of claim 1, wherein the motion detection device includes a serial input/output interface for receiving configuration information from the base unit.

8. The motion detecting camera system of claim 7, wherein the configuration information includes motion detection sensitivity information, and destination contact information identifying destinations for digital images transmitted by the motion detection device.

9. The motion detecting camera system of claim 8, wherein the destination contact information includes at least one of a cellular telephone number and an email address.

10. The motion detecting camera system of claim 8, wherein the configuration information further includes information identifying dates and times that the motion detection device is to be enabled.

11. The motion detecting camera system of claim 1, wherein the motion detection device is configured to identify types of objects appearing in the digital image, and make a determination of whether to transmit the digital image based on the identified object types.

12. The motion detecting camera system of claim 1, wherein the analog-to-digital converter converts the analog image data to the digital image data and wherein the image sensor is configured to detect further motion based on digital statistics generated from the digital image data.

13. A method of capturing and transmitting images, comprising:
providing a portable battery-powered motion detection device having a low-power image sensor and a cellular telephone transmitter for transmitting cellular telephone communications; detecting motion with the motion detection device using analog image data captured by the low-power image sensor that has not been converted into digital image data; automatically powering up an analog-to-digital converter and capturing a digital image of a scene with the image sensor in response to detection of motion; and automatically transmitting the captured image via the transmitter to a cellular telephone for display.

14. The method of claim 13, and further comprising: receiving configuration information with the motion detection device, the configuration information transmitted by the cellular telephone.

15. The method of claim 14, wherein the configuration information includes motion detection sensitivity information, and destination contact information identifying destinations for images transmitted by the motion detection device.

16. The method of claim 15, wherein the destination contact information includes a cellular telephone number.

17. The method of claim 14, wherein the configuration information further includes information identifying dates and times that the motion detection device is to be enabled.

18. The method of claim 13, and further comprising: automatically identifying an object appearing in the captured image; and automatically determining whether to transmit the captured image based on the identified object.

19. The method of claim 13, wherein the analog-to-digital converter converts the analog image data to the digital image data and wherein the detecting motion includes detecting further motion based on digital statistics generated from the digital image data.

20. A portable low-power motion detection device, comprising:
an image sensor configured to generate analog image data and detect motion using analog image data generated by the image sensor that has not been converted into digital image data; a cellular telephone transmitter for transmitting cellular telephone communications and wherein the motion detection device is configured to automatically power up an analog-to-digital converter, capture a digital image and transmit the captured digital image via the transmitter to a predetermined cellular telephone destination upon detection of motion.

* * * * *